(12) United States Patent
Sander et al.

(10) Patent No.: US 9,889,934 B2
(45) Date of Patent: Feb. 13, 2018

(54) DIGITAL CREW ASSIST

(71) Applicant: Airbus Operations GmbH, Hamburg (DE)

(72) Inventors: Peter Sander, Hamburg (DE); Jan Reh, Hamburg (DE); Peter Leopold Pirklbauer, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 14/700,618

(22) Filed: Apr. 30, 2015

(65) Prior Publication Data

US 2015/0314875 A1 Nov. 5, 2015

(30) Foreign Application Priority Data

Apr. 30, 2014 (EP) .................................... 14166542

(51) Int. Cl.
*G08B 21/00* (2006.01)
*B64D 11/00* (2006.01)

(52) U.S. Cl.
CPC ................ *B64D 11/0015* (2013.01)

(58) Field of Classification Search
CPC ................................. B64D 11/0015
See application file for complete search history.

(56) References Cited

U.S. PATENT DOCUMENTS

| | | | |
|---|---|---|---|
| 6,218,958 B1 * | 4/2001 | Eichstaedt | G08B 6/00 340/4.12 |
| 6,744,381 B1 | 6/2004 | Collins | |
| 8,430,310 B1 | 4/2013 | Ho et al. | |
| 2004/0249423 A1 * | 12/2004 | Savage | A61M 21/00 607/88 |
| 2005/0121978 A1 | 6/2005 | Mcavoy | |
| 2007/0284474 A1 * | 12/2007 | Olson | H04W 4/046 244/10 |
| 2009/0319902 A1 * | 12/2009 | Kneller | G06F 3/013 715/733 |
| 2012/0306643 A1 * | 12/2012 | Dugan | A61B 5/02 340/539.12 |
| 2013/0248652 A1 | 9/2013 | Godecker et al. | |
| 2014/0039717 A1 | 2/2014 | Henkel | |
| 2014/0039840 A1 | 2/2014 | Yuen et al. | |

FOREIGN PATENT DOCUMENTS

| | | |
|---|---|---|
| EP | 1980489 | 10/2008 |
| EP | 2693406 | 2/2014 |

OTHER PUBLICATIONS

European Search Report, dated Sep. 29, 2014.

* cited by examiner

*Primary Examiner* — Omeed Alizada
(74) *Attorney, Agent, or Firm* — Greer, Burns & Crain, Ltd.

(57) ABSTRACT

A wearable device that is wearable by a user and connectable with one or more aircraft related systems, a device system comprising a plurality of such wearable devices, and an aircraft comprising such a device system. The wearable device that is connectable to one or more aircraft related systems comprises a system interface via which the wearable device is connectable to one or more aircraft related systems, and a control unit configured to communicate with at least one of the one or more aircraft related systems via the system interface.

18 Claims, 3 Drawing Sheets

DIGITAL CREW ASSIST

CROSS-REFERENCES TO RELATED APPLICATIONS

This application claims the benefit of the European patent application No. 14166542.2 filed on Apr. 30, 2014, the entire disclosures of which are incorporated herein by way of reference.

BACKGROUND OF THE INVENTION

The present disclosure generally relates to wearable devices. More specifically, the present disclosure relates to a wearable device that is connectable to aircraft related systems, a device system comprising a plurality of such wearable devices, and an aircraft comprising such a device system.

Nowadays, the cabin crew usually uses paper in order to note down flight related information, passenger related information or other aircraft related information. Further, in order to retrieve information from or input information into onboard aircraft systems, the cabin crew typically uses fixed devices on board an aircraft such as Flight Attendant Panels (FAPs).

Further, in EP 2 693 406 A2 and US 2014/0039717 A1, it is proposed to use at least one mobile recording device for recording items of multimedia information relating to a state of a component, for example, a component present on board a means of transport, and for transmitting the recorded items of multimedia information, relating to the state of the component, to a central logbook equipment. The central logbook equipment is configured to generate a multimedia logbook entry on the basis of the transmitted items of multimedia information, and to store the generated multimedia logbook entry.

During use of such mobile devices one or both hands of the user are occupied. Further, a pocket or other storage or attachment device is needed in order to carry such mobile device.

Accordingly, there is a demand for convenient techniques for connection to aircraft related systems.

SUMMARY OF THE INVENTION

According to a first aspect, a wearable device is provided. The wearable device is connectable to one or more aircraft related systems. The wearable device comprises a system interface and a control unit. Via the system interface the wearable device is connectable to the one or more aircraft related systems. The control unit is configured to communicate with at least one of the one or more aircraft related systems via the system interface.

The system interface may be realized as a hardware component integrated into the wearable device, such as, for example, as an interface card or other interface component installed in the wearable device.

The one or more aircraft related systems may comprise any system typically arranged on board an aircraft, for example, any electronic or electrical system arranged on board an aircraft. Further, the one or more aircraft related systems may comprise any system that is arranged off-board an aircraft, but that provides information associated with the aircraft.

The wearable device is wearable by a user. In contrast to mobile devices such as smartphones, tablets or notebooks, the wearable device is not only portable such that it can be carried by a user, but it can be attached to the body of a user without additional elements such as a carrying bag or a hook and loop fastener.

The control unit may be configured to retrieve information from at least one of the one or more aircraft related systems to which the wearable device is connected via the system interface. Alternatively or additionally, the control unit may be configured to forward information to at least one of the one or more aircraft related systems to which the wearable device is connected via the system interface. For both retrieving and forwarding information, the system interface may connect to at least one of the one or more aircraft related systems by means of a wireless or wired data connection.

The communication between the wearable device and the one or more aircraft related systems may be or comprise one-directional or bi-directional communication. For example, the control unit may be configured to one-directionally communicate with the one or more aircraft related systems by transmitting data to the one or more aircraft related systems via the system interface. Alternatively, the control unit may be configured to one-directionally communicate with the one or more aircraft related systems by receiving data from the one or more aircraft related systems via the system interface. Alternatively, the control unit may be configured to bi-directionally communicate with the one or more aircraft related systems by transmitting data to and by receiving data from the one or more aircraft related systems via the system interface.

The communication between the wearable device and the one or more aircraft related systems may comprise wireless communication techniques. For example, Wireless Local Area Network (WLAN) techniques which are also sometimes referred to as Wi-Fi techniques and/or Bluetooth techniques may be used for wireless communication.

The wearable device may further comprise a user interface. The user interface may be configured to receive a user input. The control unit may be configured to generate one or more control instructions corresponding to the received user input. The user interface may comprise an output component configured to output information such as information retrieved from at least one of the one or more aircraft related systems to which the wearable device is connected. The user interface may comprise an input component configured to receive the user input. For example, the user interface may be configured as or comprise a display as an output component, for example a display with additional input options such as a touch-sensitive display. On the display, retrieved information may be displayed. Information may be input by means of a touch input. Alternatively or additionally, the user interface may be configured as or comprise a speech input unit such as a microphone in order to receive a user input. Further, the user interface may be configured as or comprise a speech output unit such as a loudspeaker in order to output retrieved information.

The user interface of the wearable device may be configured to display status information of the one or more aircraft related systems. For example, the control unit of the wearable device may be configured to control the user interface to display such status information. The control unit may further be configured to communicate a control instruction to the one or more aircraft related systems upon an input received via the user interface. The control instruction may comprise one or more parameters defining specifics of the operation to be performed. An aircraft related system receiving a control instruction from the wearable device may process the control instruction and perform a corresponding operation in accordance with the control instruction. The control unit may also be configured to receive status information communicated from the aircraft related system.

The wearable device may comprise a device interface. Via the device interface the wearable device may be connectable to at least one of one or more other wearable devices and one or more mobile devices. The control unit may be configured to communicate with the at least one of the one or more other wearable devices and the one or more mobile devices via the device interface. The one or more other wearable devices may be configured in the same way as the wearable device described herein. The one or more mobile devices may be configured as or comprise a mobile or portable terminal such as a notebook, a tablet and/or a smartphone.

The control unit may be configured to forward information retrieved from at least one of the one or more aircraft related systems to which the wearable device is connected to a user interface of the wearable device. The user interface may output the information received from the control unit. Alternatively or additionally, the control unit may be configured to forward information retrieved from at least one of the one or more aircraft related systems to which the wearable device is connected to a memory unit of the wearable device. The memory unit may store the information received from the control unit. Alternatively or additionally, the control unit may be configured to forward information retrieved from at least one of the one or more aircraft related systems to which the wearable device is connected to a server unit to which the wearable device is connected via a server interface. The server unit may store and/or further process the information received from the control unit. Alternatively or additionally, the control unit may be configured to forward information retrieved from at least one of the one or more aircraft related systems to which the wearable device is connected to a mobile device to which the wearable device is connected via a device interface. The mobile device may store and/or further process the information received from the control unit.

The control unit may be configured to obtain information to be forwarded to at least one of the one or more aircraft related systems to which the wearable device is connected from the user interface of the wearable device. For example, the user interface may provide the control unit with a received user input, the control unit may generate a control instruction corresponding to the received user input and the control unit may forward the control instruction. Alternatively or additionally, the control unit may be configured to obtain information to be forwarded to at least one of the one or more aircraft related systems to which the wearable device is connected from a memory unit of the wearable device. For example, the control unit may obtain a predefined control instruction from the memory and may forward the control instruction. Alternatively or additionally, the control unit may be configured to obtain information to be forwarded to at least one of the one or more aircraft related systems to which the wearable device is connected from a server unit to which the wearable device is connected via a server interface. For example, the server unit may provide the control unit with a control instruction and the control unit may forward the control instruction. Alternatively or additionally, the control unit may be configured to obtain information to be forwarded to at least one of the one or more aircraft related systems to which the wearable device is connected from a mobile device to which the wearable device is connected via a device interface. For example, the mobile device may provide the control unit with a control instruction corresponding to a user input received at the mobile device and the control unit may forward the control instruction. In this case, the user input is not input on the wearable device but on the mobile device connected thereto.

The one or more aircraft related systems may comprise one or more onboard systems provided on board an aircraft. Alternatively or additionally, the one or more aircraft related systems may comprise one or more airport systems provided at or in an airport. The control unit may be configured to communicate with (i) the one or more onboard systems provided on board the aircraft via the system interface or (ii) the one or more airport systems provided at or in the airport (i.e., off-board the aircraft) via the system interface or (iii) with both the one or more onboard systems provided on board the aircraft and the one or more airport systems provided at or in the airport (i.e., off-board the aircraft) via the system interface.

The one or more onboard systems may comprise a cabin system (sometimes also referred to as cabin management system). The one or more onboard systems may comprise any number of network components or network devices such as sensors, actuators and the like.

The one or more onboard systems, e.g., a cabin system, may comprise a plurality of cabin components. Just to give examples for illustration rather than limitation, the cabin components may comprise or be configured as at least one of a passenger service unit, elements of a passenger service unit and a cabin illumination unit. Passenger service units may be arranged above the passenger seats and may provide passenger related functions to the passengers. For this purpose, passenger service units may comprise at least one of a fasten-seatbelt sign, a non-smoking sign, a flight attendant call button, a reading light and a loudspeaker. Cabin illumination units may be arranged in the cabin ceiling close to the overhead bins along the alleys of the cabin and may comprise, for example, LED strips or fluorescent light strips providing light to illuminate the cabin. A cabin component receiving a control instruction from the control unit may process the control instruction and perform an operation in accordance with the control instruction. For example, a passenger service unit may receive a control instruction to turn on the fasten-seatbelt sign and a cabin illumination unit may receive a control instruction to reduce its brightness and generate a dimmed ambient light. Likewise, the control unit may retrieve information from a cabin component. For example, if a flight attendant call button is activated, the corresponding passenger service unit may forward information to the control unit informing the control unit that a certain flight attendant call button has been activated. The corresponding information may be output, e.g., displayed, on the user interface to inform the flight attendant wearing the wearable device.

The one or more onboard systems may comprise a Flight-Attendant Panel (FAP) provided onboard an aircraft. In this case, the control unit may be configured to communicate with the FAP. Alternatively or additionally, the one or more onboard systems may comprise a Cabin Intercommunication Data System (CIDS) provided onboard an aircraft. In this case, the control unit may be configured to communicate with the CIDS.

The control unit may be configured to receive boarding status information from an onboard system or an airport system. The boarding status information may comprise information indicating the number of passengers which have already boarded the aircraft or information indicating whether any passengers are missing. The boarding status information may be output on the user interface of the wearable device. The control unit may be configured to receive food selection information from an onboard system. The food selection information may indicate the type of food selected by one or more passengers of the aircraft. The control unit may be configured to receive status information of occupied areas from an onboard system. The status information of occupied areas may indicate whether and, if so, which areas of the aircraft are occupied. The occupied area may be or comprise a lavatory. The control unit may be configured to receive emergency information from an onboard system. The emergency information may indicate suitable emergency exits or the like. The control unit may be configured to receive general flight information from an onboard system. The general flight information may comprise information about the time of arrival, weather information, delay information, speed information, altitude information and the like. The control unit may be configured to receive transit flight information from an onboard system or an airport system. The transit flight information may comprise information about the gate of transit flights, check-in procedures and the like. The control unit may be configured to receive remote galley information. The remote galley information may comprise information about the remaining time until food preparation is finished and the like.

The control unit may be configured to forward emergency light information to an onboard system. The onboard system may illuminate the emergency light in accordance with the emergency light information. The control unit may be configured to forward remote galley control information. The remote galley control information may remote control the preparation of the food, e.g., the heating time of the food and the like.

The wearable device may also allow communication between the wearable device and one or more other wearable devices or one or more mobile devices. For example, the control unit may be configured to forward text information to another wearable device and/or to receive text information from another wearable device. Alternatively or additionally, the control unit may be configured to forward audio information to another wearable device and/or to receive audio information from another wearable device. Both may enable in-ear direct communication with crew members.

In addition to communication with one or more aircraft related systems, the control unit may provide additional information to the crew members. For example, the control unit may be configured to provide telemedical remote assistance information. The telemedical remote assistance information may provide assistance in helping a sick passenger or the like. The control unit may further provide translation functions. For example, a term to be translated may be input via the user interface, the control unit may perform the translation and the user interface may output the translated term. The control unit may provide heart rate monitoring. For example, the control unit may monitor the heart rate of a crew member and may derive the level of stress therefrom. If the level of stress is too high, the control unit may inform the crew member accordingly. Similarly, jet-lag assistance may be provided by the control unit. For example, the control unit may inform the crew member of sleep cycles and the like. The control unit may provide email functions, telephone functions and/or, video call functions. The control unit may provide instant video functions. For example, the wearable device may comprise a camera unit for acquiring images of passenger, e.g., for recording images of rude behavior of a passenger. The control unit may process the acquired images. For example, the control unit may forward the acquired images to a server unit. The control unit may provide working hours functions. For example, the control unit may monitor the working hours of crew members and may record the working hours in a server unit or the like.

The one or more airport systems may comprise a check-in system of an airline or any other conceivable airport system.

The wearable device may comprise an attachment unit configured to be attached to a body of a user. The attachment unit may be an integrated part of the wearable device. The wearable device may be attached to the body of a user via the attachment unit. The wearable device as described herein may comprise or may be configured as a head-mounted device such as glasses. Alternatively or additionally, the wearable device may comprise or may be configured as a wrist-attachable device such as a wristwatch.

According to a second aspect, a device system is provided. The device system comprises a plurality of wearable devices as described herein. At least a subset of the wearable devices may be interconnected with each other.

The device system may further comprise a plurality of mobile devices. At least a subset of the wearable devices may be connected to at least a subset of the mobile devices via a data connection, e.g., a wireless data connection. The device system may comprise one or more server units. At least a subset of the wearable devices may be connected to at least a subset of the one or more server units via a data connection, e.g., a wireless data connection.

According to a third aspect, an aircraft comprising a device system as described herein may be provided.

According to a fourth aspect, a computer program may be provided. The computer program may be stored on the wearable device. For example, the computer program may be stored in the control unit or a memory unit of the control unit. The computer program comprises program code portions for carrying out one or more of the aspects described herein, when the computer program is run or executed on the wearable device such as a microprocessor, a microcontroller or a digital signal processor (DSP) of the wearable device. For example, an application (in short: app) may be downloaded by aircraft personnel (crew members), e.g., flight attendants, on their wearable devices, stored on the wearable devices and then executed on the wearable devices. When running, the app may be controlled by the control unit to carry out the details set forth above. Further, a corresponding app may be downloaded on mobile devices. The app suitable for the mobile devices may have additional functionalities as compared with the app suitable for the wearable devices.

Even if some of the above aspects are described herein with respect to data wearable device, the device system or the aircraft, these aspects may also be implemented as a method or as a computer program for performing or executing the method. Likewise, aspects described as or with reference to a method may be realized by suitable units (even if not explicitly mentioned) in the wearable device, the device system or the aircraft or by means of the computer program. All of the above described aspects may be implemented by hardware circuitry and/or by software.

BRIEF DESCRIPTION OF THE DRAWINGS

In the following, the present disclosure will further be described with reference to an exemplary embodiment illustrated in the figures, in which.

DETAILED DESCRIPTION OF THE PREFERRED EMBODIMENTS

In the following description, for purposes of explanation and not limitation, specific details are set forth in order to provide a thorough understanding of the present disclosure. It will be apparent to one skilled in the art that the present disclosure may be practiced in other embodiments that depart from these specific details. For example, the skilled person will appreciate that the present disclosure may be practiced with other aircraft related information different from the specific examples discussed below to illustrate the present disclosure. Even if in the below the present disclosure is described only with respect to specific aircraft related systems, the disclosure may equally be practiced with other aircraft related systems. Further, even if in the below the present disclosure is described only with respect to two aircraft related systems, the disclosure may equally be practiced in any other environment having a different number of aircraft related systems.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the present disclosure is described as a method, it may also be embodied in a device (i.e., the wearable device described below or device system), a computer processor and a memory coupled to a processor, wherein the memory is encoded with one or more programs that perform the methods disclosed herein when executed by the processor. Further, although the embodiment is described below with respect to hardware units and hardware components, the present disclosure is not limited thereto, but one or more applications (in short: apps) may be running on the wearable device in order to perform the functions described below.

Figure 1:
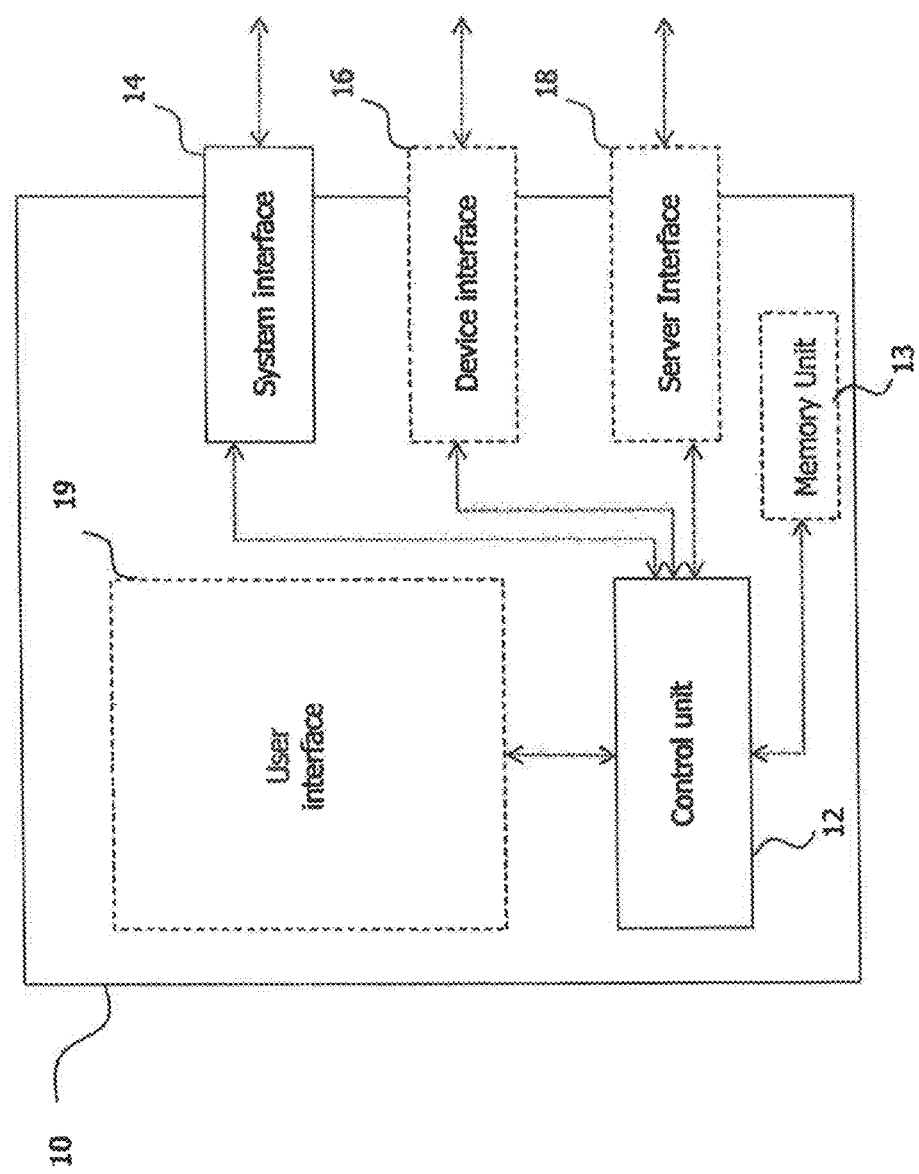
FIG. 1 schematically illustrates a device embodiment of a wearable device that is connectable to aircraft related systems.

FIG. 1 schematically illustrates a device embodiment of a wearable device 10 that is wearable by a user and connectable to aircraft related systems. The wearable device 10 comprises a control unit 12 and a system interface 14. Via the system interface 14 the wearable device 10 is connectable to one or more aircraft related systems.

Figure 2:
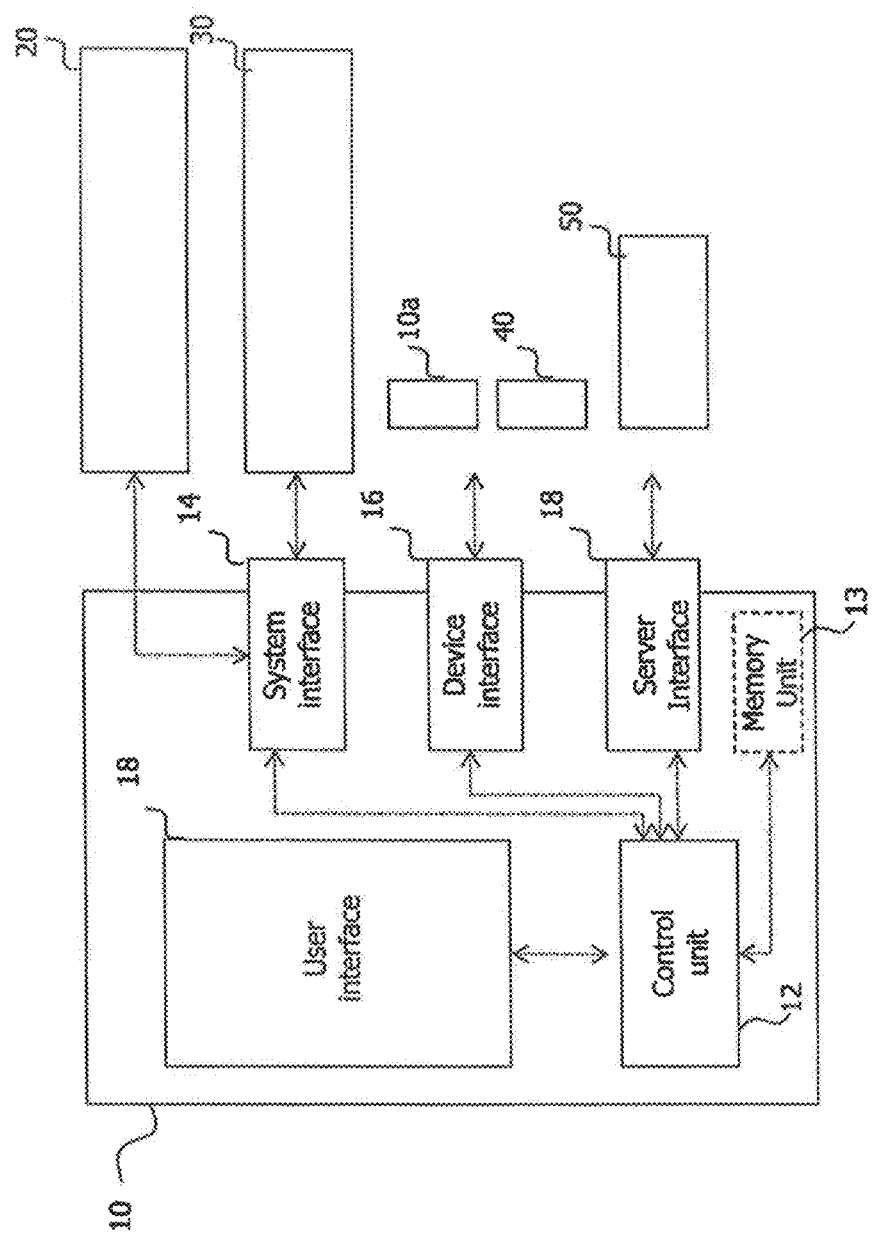
FIG. 2 schematically illustrates the device embodiment of the wearable device of FIG. 1 connected with aircraft related systems and devices to form a device system.

Referring to FIG. 2, for sake of explanation rather than limitation, an onboard system 20 provided on board an aircraft is shown as an example of an aircraft related system. Further, for sake of explanation rather than limitation, an airport system 30 provided at or in an airport is shown as another example of an aircraft related system. The system interface 14 may connect the wearable device 10 to the onboard system 20 and the airport system 30 independently from each other or in parallel to each other via or wired or wireless data connection. In other words, the system interface 14 may connect the wearable device 10, via a wired or wireless data connection, with (i) only the onboard system 20 or (ii) only the airport system 30 or (iii) both the onboard system 20 and the airport system 30.

By way of example, the control unit 12 is configured to communicate with the onboard system 20 and the airport system 30 via the system interface 14. However, it may equally be possible that the control unit 12 is configured to communicate with the onboard system 20 only during a certain time period or with the airport system 30 only during a certain time period via the system interface 14. For example, when the aircraft is in the air, the control unit 12 may only communicate with the onboard system 20. When the aircraft is on ground, the control unit 12 may communicate with the onboard system 20 and/or the airport system 30.

Returning to FIG. 1, the wearable device 10 may further comprise a memory unit 13, a device interface 16, a server interface 18 and a user interface 19.

Via the device interface 16 the wearable device 10 is connectable to at least one of one or more other wearable devices 10a and one or more mobile devices 40, one of each is shown by way of example in FIG. 2. The control unit 12 is configured to communicate with the other wearable device 10a and the mobile device 40 via the device interface 16. In FIG. 2, only one other wearable device 10a and one mobile device 40 are shown by way of example. However, the wearable device 10 may communicate with any number of other wearable devices 10a and/or mobile devices 40.

Via the server interface 18 the wearable device 10 is connectable to one or more servers 50 provided on board the aircraft. As shown by way of example in FIG. 2, the control unit 12 is configured to communicate with the server 50 via the server interface 18. In FIG. 2, only one server 50 is shown by way of example. However, the wearable device 10 may communicate with any number of servers 50.

A user may input an input via the user interface 19. In the present example, the user interface 19 comprises a touch-sensitive display unit and a speech input/output unit. Instead of a touch-sensitive display unit, the user interface may comprise a display unit and additional touch sensitive-elements such as touch-keys. The display part of the touch-sensitive display unit functions as an output unit and the touch-sensitive part of the touch-sensitive display unit functions as an input unit. Likewise, a loudspeaker part of the speech input/output unit functions as an output unit and a microphone part of the speech input/output unit functions as an input unit. In addition or alternatively to the loudspeaker part, an ear-phone port may be provided so that speech can be output via an ear-phone connected thereto. In response to the input received via the user interface 19, the control unit 12 may generate corresponding control instructions and may communicate the generated control instructions to the onboard system 20 and/or the airport system 30.

The onboard system 20 may comprise or be configured as a cabin management system, for example a Cabin Intercommunication Data System (CIDS) as typically employed in Airbus aircrafts, like the A380. The cabin management system, e.g., CIDS, may be connected to the wearable device 10. The wearable device 10 provides a remote user interface to the cabin management system and may be operated by aircraft personnel to control and monitor various cabin functions in combination with cabin management system. Status information of cabin components of the CIDS may be displayed on the user interface 19 of the wearable device 10 and a flight attendant desiring to control one or more of the cabin components may use the wearable device 10 to correspondingly control the respective cabin components by inputting a corresponding input on the user interface 19 of the wearable device.

Figure 3:
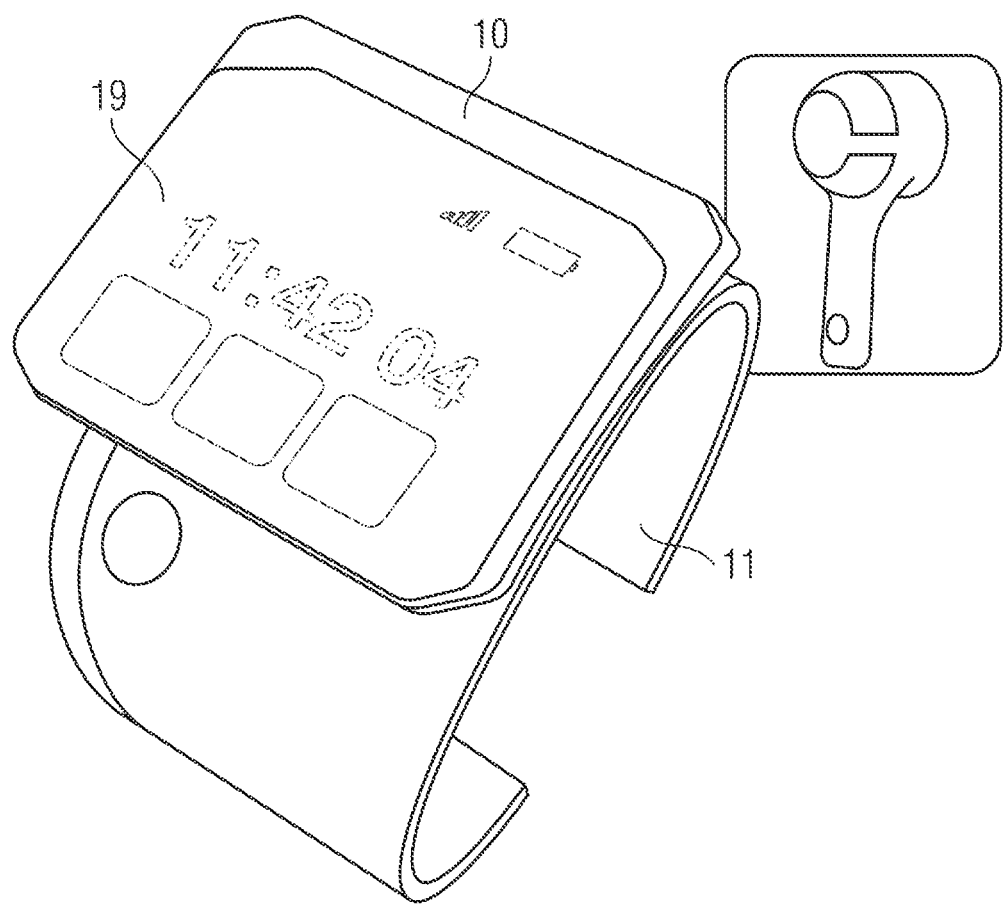
FIG. 3 schematically illustrates a possible appearance of the device embodiment of the wearable device of FIG. 1.

FIG. 3 shows a possible outer appearance of the wearable device 10 of FIG. 1. In accordance with FIG. 3, the wearable device 10 has the appearance of a wristwatch. The wristwatch may have normal watch functionalities in addition to the specific functionalities of the wearable device 10 as described herein. The wearable device 10 of FIG. 3 comprises a display as one conceivable implementation of an output unit of the user interface 19. Multiple touch keys are provided on the display as one conceivable implementation of an input unit of the user interface 19. By means of the touch keys, a user can obtain quick access to certain functionalities or scroll through the functionalities. In order to attach the wristwatch to a body of the user, in more detail, to a wrist of a user, the wearable device exemplary comprises a wristband as an example of an attachment unit 11.

In the following, some possible functionalities of the wearable device 10 are explained below in the order from the boarding process until landing of an aircraft. If some functionalities are not mentioned below, this does not imply that the wearable device 10 is not capable of implementing such functions, but only that the description of these functions is omitted for sake of brevity. Further, the description of the functionalities below does not imply that all of the mentioned functions have to be implemented necessarily on the wearable device 10, but only that they can be implemented.

At first, a flight attendant attaches the wearable device 10 to its wrist by means of the wristband before entering the aircraft. Likewise, other flight attendants attach other wearable devices 10a to their wrists before entering the aircraft.

After boarding, the flight attendant checks on the wearable device 10 whether boarding is completed. For this purpose, the flight attendant touches a touch key related to the retrieval of boarding information. In response to the touch of the touch key, the wearable device 10 requests the retrieval of boarding information. The boarding information may be stored in an onboard system 20 on board the aircraft. For example, the boarding information may indicate that all passengers have boarded the aircraft. The boarding information may be retrieved from the control unit 12 of the wearable device 10 from the aircraft system 20 via the system interface 14 and a corresponding output such as "boarding completed" may be displayed on the user interface 19. The flight attendant may touch a touch key in order to forward the boarding information to other wearable devices 10a. In response to the touch input, the control unit 12 forwards the boarding information to the other wearable devices 10a. Alternatively or additionally, the flight attendant inputs speech information into a microphone part of the user interface 19 in order to inform the other flight attendants. The speech information is transmitted to the other wearable devices 10a via the device interface 14. In this way, all flight attendants can be efficiently informed about the boarding process.

Further, before take-off, the flight attendant checks via the wearable device 10 whether any lavatories are occupied. For this purpose, the control unit 12 of the wearable device 10 requests the status of all lavatories and the lavatories may inform the control unit 12 accordingly via the system interface 14. Information about the status of the lavatories is then output on the user interface 19. If none of the lavatories is occupied, e.g. as indicated by an output such as "lavatories not occupied," the aircraft is ready for take-off. Alternatively, the user interface 19 may output information that a lavatory is occupied, e.g., the term "aft lavatory occupied."

During flight, a passenger, for example, presses a service call button on its associated passenger service unit. In response thereto, the wearable device 10 is informed about the activation of the service call button and about the exact position of the service call button in terms of row and seat. The respective information such as "row 12, seat B requests service" is output on the user interface 19. The flight attendant can then quickly serve the passenger. A passenger may input his request into the user interface 19 and the control unit 12 may perform translation algorithms to translate the request into a desired language.

When serving food to the passengers, the flight attendant retrieves food selection information from an onboard system 20 by means of the wearable device 10. The food selection information may indicate the row and seat of the passenger and the associated food selection. The food selection may have been previously input by the passengers via an input unit provided in the seat of the passenger or any other suitable input unit. In this way, the flight attendant does not have to ask for the food selection, but can quickly serve all passengers based on the food selection information output on the user interface 19 such as "food selection row 3, seat A: fish."

During a long flight, the flight attendant may be automatically informed by the wearable device 10 about suitable sleep cycles in order to minimize jetlag. Further, the heart rate of the flight attendant may be monitored regularly by the wearable device 10 in order to determine the level of stress of the light attendant. Still further, in case of misbehavior of a passenger, the flight attendant can use a camera component of the wearable device 10 in order to record video images of the misbehavior. If the wearable device 10 does not have a camera, the flight attendant may use the camera of its mobile device 40 such as a smartphone. The flight attendant may then select a touch key on the user interface 19 instructing the control unit 12 to inform the mobile device 40 that the video images are to be transmitted to a server unit 50 on board the aircraft.

Before arrival, a passenger asks the flight attendant about information concerning his connection flight. The flight attendant touches one or more corresponding touch keys to request the respective information from an onboard system 20. The requested information is then output on the user interface 19 and the flight attendant can inform the passenger accordingly, e.g., about the gate of the connection flight and the like.

As can be seen from the above, the wearable device 10 provides a convenient technique of connecting to aircraft related systems. Further, the wearable device 10 provides a fast access to information stored in the aircraft related systems.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A wearable device that is connectable to one or more aircraft related systems, the wearable device comprising:
　a system interface configured to connect to one or more aircraft related systems; and a control unit configured to communicate with at least one of the one or more aircraft related systems via the system interface, wherein the wearable device is configured to monitor a wearer of the wearable device and provide the wearer with information based on monitoring of the wearer; and a device interface via which the wearable device is connectable to at least one of one or more other wearable devices and one or more mobile device wherein the control unit is configured to communicate with the at least one of the one or more other wearable devices and the one or more mobile devices via the device interface; and wherein working hours of the wearer are monitored and the working hours are recorded in a server.

2. The wearable device of claim 1, wherein the control unit is configured to at least one of:
retrieve information from at least one of the one or more aircraft related systems to which the wearable device is connected via the system interface; and
forward information to at least one of the one or more aircraft related systems to which the wearable device is connected via the system interface.

3. The wearable device of claim 1, wherein the wearable device further comprises a user interface configured to receive a user input, wherein the control unit is configured to generate one or more control instructions corresponding to the received user input.

4. The wearable device of claim 1, wherein the control unit is configured to at least one of:
forward information retrieved from at least one of the one or more aircraft related systems to which the wearable device is connected to at least one of a user interface of the wearable device, a memory unit of the wearable device, a server unit to which the wearable device is connected via a server interface and one or more mobile devices to which the wearable device is connected via a device interface; and
obtain information to be forwarded to at least one of the one or more aircraft related systems to which the wearable device is connected from at least one of the memory unit of the wearable device, the server unit to which the wearable device is connected via the server interface and the one or more mobile devices to which the wearable device is connected via the device interface.

5. The wearable device of claim 1, wherein the one or more aircraft related systems comprise at least one of one or more onboard systems provided onboard an aircraft and one or more airport systems provided at an airport.

6. The wearable device of claim 1, wherein the wearable device comprises an attachment unit configured to be attached to a body of a user.

7. The wearable device of claim 1, wherein the wearable device comprises a head-mounted device.

8. The wearable device of claim 1, wherein the wearable device comprises a wrist attachable device.

9. The wearable device of claim 1, wherein the control unit is configured to at least one of:
communicate with a Flight-Attendant Panel provided on board the aircraft,
communicate with a Cabin Intercommunication Data System provided on board an aircraft,
forward text information,
receive text information,
forward audio information,
receive audio information,
receive boarding status information,
receive food selection information,
receive status information of occupied areas,
forward emergency light information, receive emergency information, receive general flight information,
receive transit flight information,
receive remote galley information, and
forward remote galley control information.

10. The wearable device of claim 1, wherein the control unit is further configured to provide at least one of:
telemedical remote assistance information,
translator functions,
heart rate monitoring,
jet-lag assistance,
email functions,
telephone functions,
video call functions,
instant video functions, and
working hours functions.

11. A device system comprising a plurality of wearable devices that are connectable to one or more aircraft related systems, the wearable devices each comprising:
a system interface configured to connect to one or more aircraft related systems; and
a control unit configured to communicate with at least one of the one or more aircraft related systems via the system interface, and
a device interface via which the wearable device is connectable to at least one of one or more other wearable devices and one or more mobile devices, wherein the control unit is configured to communicate with the at least one of the one or more other wearable devices and the one or more mobile devices via the device interface, wherein each wearable device is worn by a different user; and
wherein working hours of the wearer are monitored and the workin hours are recorded in a server.

12. The device system of claim 11, wherein at least a subset of the wearable devices is interconnected with each other.

13. The device system of claim 11, wherein the device system comprises a plurality of mobile devices, wherein at least a subset of the wearable devices is connected to at least a subset of the mobile devices via a data connection.

14. The device system of claim 11, the device system comprising one or more server units, wherein at least a subset of the wearable devices is connected to at least a subset of the one or more server units via a data connection.

15. An aircraft comprising a device system comprising a plurality of wearable devices that are connectable to one or more aircraft related systems, the wearable devices each comprising:
a system interface configured to connect to one or more aircraft related systems; and
a control unit configured to communicate with at least one of the one or more aircraft related systems via the system interface, and
a device interface via which the wearable device is connectable to at least one of one or more other wearable devices and one or more mobile devices, wherein the control unit is configured to communicate with the at least one of the one or more other wearable devices and the one or more mobile devices via the device interface, wherein each wearable device is worn by a different user; and
wherein working hours of the wearer are monitored and the working hours are recorded in a server.

16. The wearable device of claim 1, wherein the wearable device comprises a device interface via which the wearable device is connectable to at least one of one or more other wearable devices and one or more mobile devices, wherein the control unit is configured to communicate with the at least one of the one or more other wearable devices and the one or more mobile devices via the device interface.

17. The wearable device of claim 1, wherein the wearable device monitors a heart rate of the wearer in order to determine a level of stress of the wearer.

18. The wearable device of claim 1, wherein the wearable device monitors the wearer for jetlag in order to minimize jetlag.

\* \* \* \* \*